US006582825B2

(12) United States Patent
Amarasekera et al.

(10) Patent No.: US 6,582,825 B2
(45) Date of Patent: Jun. 24, 2003

(54) HYDROPHOBICITY IMPARTING PARTICULATE

(75) Inventors: Jayantha Amarasekera, Clifton Park, NY (US); John Raymond Krahn, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/943,236

(22) Filed: Aug. 30, 2001

(65) Prior Publication Data

US 2002/0041969 A1 Apr. 11, 2002

Related U.S. Application Data

(62) Division of application No. 09/760,124, filed on Jan. 16, 2001, now abandoned, which is a continuation of application No. 09/472,466, filed on Dec. 27, 1999, now abandoned.

(51) Int. Cl.$^7$ .............................................. B32B 25/20
(52) U.S. Cl. ....................... 428/417; 524/425; 524/492; 524/588; 528/24; 428/405; 525/477; 174/137 R
(58) Field of Search ................................ 524/588, 425, 524/492; 528/24; 428/405, 447; 525/477; 174/137 R

(56) References Cited

U.S. PATENT DOCUMENTS

| | | | |
|---|---|---|---|
| 3,965,065 A | 6/1976 | Elliott | |
| 4,039,503 A | 8/1977 | Itoh | |
| 4,144,222 A | 3/1979 | Shinmi et al. | |
| 4,279,783 A | 7/1981 | Kehrer et al. | |
| 4,405,425 A | 9/1983 | Schiller et al. | |
| 4,897,027 A | 1/1990 | Szaplonczay et al. | |
| 5,244,958 A | 9/1993 | Goodman | |
| 5,254,657 A | * 10/1993 | Inoue | |
| 5,326,804 A | 7/1994 | Mistry et al. | |
| 5,369,161 A | 11/1994 | Kunieda et al. | |
| 5,514,741 A | 5/1996 | Arai et al. | |
| 5,548,038 A | 8/1996 | Enami et al. | |
| 5,668,205 A | 9/1997 | Yoshida et al. | |
| 5,922,799 A | 7/1999 | Sollradl et al. | |
| 5,928,778 A | 7/1999 | Takahashi et al. | |
| 5,958,389 A | 9/1999 | Le Bras-Roulier et al. | |
| 6,015,629 A | 1/2000 | Heyer et al. | |
| 6,043,309 A | 3/2000 | Nakamura et al. | |
| 6,074,672 A | 6/2000 | Dobkowski et al. | |
| 6,162,854 A | 12/2000 | Meguriya et al. | |

FOREIGN PATENT DOCUMENTS

| | | |
|---|---|---|
| DE | 2900162 | 10/1978 |
| EP | 0050798 | 4/1982 |
| EP | 0316696 | 5/1989 |
| EP | 0470745 | 2/1992 |
| EP | 09033263 | 8/1998 |
| EP | 0902440 | 3/1999 |
| EP | 0928008 | 7/1999 |
| EP | 1052655 | 11/2000 |

OTHER PUBLICATIONS

"Polymer Outdoor Insulating Materials Part 1: Comparison of Porcelain and Polymer Electrical Insulation" by J. Mackevich and M. Shah, Raychem Corp.,—IEEE Electrical Insulation Magazine—May/Jun. 1997—vol. 13, No. 3, pp. 5–12.
"Polymers for High–Voltage Insulators"—Rubber World—Dec. 1997—pp. 42–44.
"Surface Recovery of Silicone Rubber Used for HV Outdoor Insulation" by J.W. Chang and R.S. Gorur—IEEE Transactions on Dielectrics and Electdrical Insulation, vol. 1, No. 6, Dec. 1994, pp. 1039–1046.
"Hydrophobicity of Silicone Rubber Used for Outdoor Insulation", Proceeds of the 4th Int. Conf. on Properties and Application of Dielectric Materials—Jul. 3–8, 1994.
"Laboratory Analysis of Naturally Aged Silicone Rubber Polymer Insulators From Contaminated Environments, 138 to 765 kV" by R.J. Hill, Proceedings of IEEEE Power Engineering Society Transmission and Distribution Conf.— Apr. 1994, pp. 488–493.
"Molecular Dynamic Phenomena at Polymer Surfaces and Their Relevance to Polymer Adhesion Behavior" by R. Morra, E. Occhiello, F. Garbassi, Metallized Plastics—1991, pp. 363–369.
"Performance and Ageing of Polymeric Insulators", by Torbjorn Sorqvist and A.E. Vlastos, IEEE 1997—pp. 1–9.
"Surface Characterization of LPDE Extrusion Coatings After Flame and Corona Treatments", by C.M. Cheatham, M.H. Hansen and J.L. Cooper—Polymers, Laminations & Coatings Conf., 1993, pp. 321–327.
XP–002184354—"Fractal Phenomena Dependence of Hydrophobicity on Surface Appearance and Structural Features of SIR Insulators"—X. Wang & N. Yoshimura, IEEE Transactions on Dielectrics and Electrical Insulation, vol. 6, No. 6, Dec. 1999, pp. 781–791.

* cited by examiner

Primary Examiner—Robert Dawson
Assistant Examiner—Kuo-Liang Peng
(74) Attorney, Agent, or Firm—Bernadette M. Bennett; Noreen C. Johnson

(57) ABSTRACT

A hydrophobicity imparting particulate is provided in the present invention. A silicone composition comprises (A) a silicone polymer and (B) a hydrophobicity imparting particulate filler that imparts a hydrophobicity property to the composition. An insulator comprises a housing portion that includes a cured product of (A) a silicone polymer and (B) a hydrophobicity imparting particulate filler. A hydrophobicity recovery property of a silicone polymer composition can be improved by determining a target hydrophobicity recovery property for the cured silicone composition, selecting a hydrophobicity imparting particulate (HIP) to impart the hydrophobicity recovery property to the silicone polymer composition and compounding a blend of (A) a silicone polymer and (B) the selected inorganic filler and heating to cure the blend.

4 Claims, 1 Drawing Sheet

HYDROPHOBICITY IMPARTING PARTICULATE

CROSS-REFERENCE TO RELATED APPLICATIONS

This application is a divisional of application Ser. No. 09/760,124 filed Jan. 16, 2001, now abandoned, which is a continuation of application Ser. No. 09/472,466, filed Dec. 27, 1999 now abandoned.

BACKGROUND OF THE INVENTION

The invention relates to silicone rubber compositions. In particular, this invention relates to silicone rubber compositions useful as high voltage insulators (HVI's).

High voltage insulators such as those used in power transmission lines, distribution stations or surge arrestors are typically made of porcelain or glass. Under ordinary working conditions, these high voltage insulators stand long use. A severe contaminate environment such as a seaside or an industrial district can cause insulators to degrade. High electrical stress can cause droplets of water to join together into a larger single drop known as a filament. Water filaments dissolve conductive pollution to form conductive paths that lower surface resistance. As the conductive paths form along the surface of an insulator, ohmic heating, caused by leakage current, causes a decrease in resistance and a corresponding increase in current. The heating can cause evaporation and subsequent drying to form a "dry-band". The electrical stress across this "band" or gap can be the site for electrical discharge activity (corona, arcing, and/or partial discharges). The discharge activity leads to flashover.

"Hydrophobicity" as used herein refers to a lack of affinity or a repulsion for water or failure to adsorb water. A hydrophobic surface has a low surface energy. Water resides on the surface as discrete droplets. In contrast, a hydrophilic (water-loving) surface has a high free surface energy thereby enabling water to cover the surface as a film. Periods of wetness in a contaminate environment can cause electrical discharge activity on an insulator surface that destroys hydrophobicity. If the hydrophobicity property is not recovered, more water accumulates, accelerating dry band arcing and discharge activity.

Hydrophobicity can be determined by measuring a contact angle (CA) between a substrate surface and a surface of pure water. Silicones without additives typically have a contact angle of about 114°. After corona treatment to destroy hydrophobicity, the contact angle is typically in a range between about 10° C. and about 50° C. Hydrophobicity recovery is measured after a 24-hour rest period. Recovered contact angle (RCA) conventionally, is the contact angle after the recovery period subsequent to corona treatment.

Both hydrophobicity and recovered contact angle are important properties in high voltage insulators, particularly when used in harsh environments. Thus, there is a need for silicone compositions with improved hydrophobicity properties.

SUMMARY OF THE INVENTION

The present invention relates to a particulate material that imparts an improved hydrophobicity and improved recovered contact angle property to a silicone composition. The silicone composition comprises (A) a silicone polymer and (B) an inorganic hydrophobicity imparting particulate (HIP) that imparts improved hydrophobicity properties.

In another aspect, the present invention relates to a silicone composition, comprising (a) a silicone polymer in a range between about 15% and about 50%, by weight of the total composition; (b) a hydrophobicity imparting particulate in a range between about 1% and about 50% by weight of the total composition that imparts a hydrophobicity property to the total composition; (c) an anti-tracking agent and a flame retardant in a range between about 20% and about 70% by weight of the total composition; (d) a coupling agent in a range between about 0.01% and about 1% by weight of the total composition; (e) a curing agent in a range between about 0.1% and about 5% by weight of the total composition; (f) an extending filler up to about 20% by weight of the total composition; and (g) at least one processing fluid in a range between about 0.1% and about 5% by weight of the total composition.

In another aspect, the present invention relates to a silicone composition comprising (A) a silicone polymer and (B) two or more hydrophobicity imparting particulates that impart a hydrophobicity property to the composition or at least one hydrophobicity imparting particulate that imparts a hydrophobicity property to the composition and a filler.

In another aspect, the present invention relates to an insulator comprising a housing portion. The housing portion comprises a cured product of (A) a silicone polymer and (B) an inorganic hydrophobicity imparting particulate.

In still another aspect, the present invention relates to an insulator comprising a housing portion which comprises a cured product of (A) a silicone polymer and (B) two or more hydrophobicity imparting particulates that impart a hydrophobicity property to the composition or a hydrophobicity imparting particulate that imparts a hydrophobicity property to the composition and a filler.

The present invention also relates to a method of imparting a hydrophobicity recovery property to a silicone polymer composition. In the method, a target hydrophobicity recovery property is determined for a silicone polymer composition. An inorganic hydrophobicity imparting particulate is selected to impart a hydrophobicity recovery property to a silicone polymer composition. The inorganic hydrophobicity imparting particulate is then added into the silicone polymer composition in an amount to impart the hydrophobicity recovery property.

In another aspect, the present invention relates to a method of improving a hydrophobicity property of a cured silicone polymer composition. In the method, a target hydrophobicity property is determined for a cured silicone polymer composition. An inorganic hydrophobicity imparting particulate is selected that imparts a hydrophobicity property to a silicone polymer composition. A blend of (A) a silicone polymer and (B) the selected inorganic filler is then compounded and cured by heating.

DETAILED DESCRIPTION OF THE INVENTION

Figure 1:
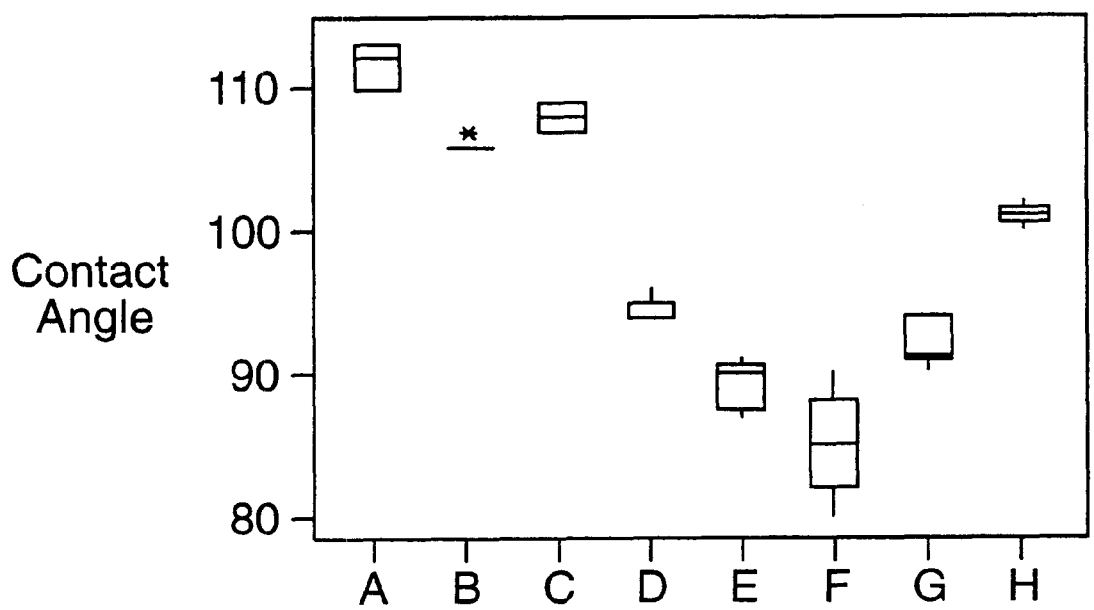
FIG. 1 is a statistical depiction of contact angles for a set of conventional hydrophobicity recovery improvers and inorganic hydrophobicity imparting particulate according to the invention.

It has been found that the addition of an inorganic particulate material improves the hydrophobicity of silicone compositions when at least a portion of an inorganic filler is replaced by an inorganic particulate material. Improved hydrophobicity includes both initial contact angle and recovered contact angle. Silicone compositions of the present invention can be prepared by compounding silicone polymer with a hydrophobicity imparting particulate that has been selected to impart the hydrophobicity recovery property. "Hydrophobicity imparting particulate" as used herein refers to an inorganic material that substantially improves either the hydrophobicity properties of a silicone polymer composition and/or substantially improves the recovered contact angle of the composition.

The hydrophobicity improving particulate can be a silicate or a carbonate. Suitable silicates include layered silicate minerals and three dimensional silicates. Examples of layered silicates include clay minerals such as kaolinite, halloysite, montmorillonite (bentonite or fuller's earth), vermiculite, nontronite, hectorite, laponite, saponite and beidellite; micas such as muscovite, phlogopite, biotite; brittle micas such as margarite, clintonite; serpentines such as antigorite and chrysotilesoapstone; and other silicates such as chrystolite, talc, and pyrophyllite.

Suitable hydrophobicity imparting particulates include three dimensional silicates such as feldspars, zeolites, ultramarines and mixtures thereof. Examples of feldspars include orthoclase, albite and anorthite. Examples of suitable mixtures of these three dimensional silicates include mixtures of orthoclase and abite or mixtures of different proportions as referred to as alkali feldspars. Such alkali feldspars include sanidine and anorthoclase. Mixtures of albite and anorthite are suitable. These mixtures are called plagioclase feldspars and include oligoclase, andesine, laradorite and bytownite. Examples of zeolites include faujasite, analcite, chabazite, heulandite, stilbite and natrolite. Examples of ultramarines include sodalite, noselite and ultramarine.

Carbonates used in the present invention include calcite (calcium carbonate), magnesite (magnesium carbonate), siderite, iron carbonate, rhodochrosite (manganese carbonate), smithsonite (zinc carbonate), zinc carbonate and strontium carbonate. Suitable hydrophobicity imparting particulates also include mixtures of carbonates and silicates, for example, a mixture of calcium carbonate and magnesium carbonate and a mixture of magnesium silicate and calcium carbonate.

In one embodiment of the present invention, the inorganic hydrophobicity imparting particulate excludes calcium carbonate, silica, ground quartz, magnesium silicate and magnesium aluminum silicate.

The hydrophobicity imparting particulate is typically present in an amount in a range between about 1% by weight and about 50% by weight of the total composition. More typically, the hydrophobicity imparting particulate is present in an amount in a range between about 5% by weight and about 25% by weight and most typically in a range between about 12% by weight and about 18% by weight of the total composition.

The hydrophobicity imparting particulate is commonly used in a finely ground or particulate form. The hydrophobicity imparting particulate can be used as provided or when the hydrophobicity imparting particulate includes surface silanol groups or the like, it can be surface treated with a treating agent such as a silane coupling agent. The treating agent enhances interaction of the hydrophobicity imparting particulate with the polysiloxane thus enhancing dispersibility and hydrophobicity effect. The treating agent can also be chosen to provide hydrophobic groups on the mineral surface to facilitate polymer particulate interaction and to impart improved mechanical properties to the final polymer product. An organosilane coupling agent when used as a treating agent for the hydrophobicity imparting particulate can act as a surface modifier for the high voltage insulator and as a crosslinker for the coupling between the hydrophobicity imparting particulate with the siloxane polymer.

A recurring unit of Formula I represents the silicone polymer used in the silicone compositions of the present invention:

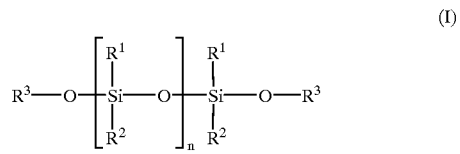

(I)

wherein, $R^1$ independently at each occurrence represents $C_{1-4}$ alkyl, or $C_{2-4}$ alkylene; $R^2$ independently at each occurrence represents $C_{1-4}$ alkyl, $C_1-C_4$ haloalkyl, or $C_{2-4}$ alkylene; $R^3$ independently at each occurrence represents H, $C_{1-10}$ alkyl, $C_{2-4}$ alkylene, $C_{4-6}$ cycloalkyl, OH, $C_1-C_4$ haloalkyl; and "n" represents an integer in a range between about 1,000 and about 20,000.

A further preferred composition comprises a silicone polymer wherein, $R_1$ independently at each occurrence represents, $CH_3$ or $CH=CH_2$; $R^2$ independently at each occurrence represents $CH_3$, $CH_2CH_2CF_3$, or $CH=CH_2$; $R^3$ at each occurrence represents $CH_3$, $CH=CH_2$, OH, or $CH_2CH_2CF_3$; and "n" represents an integer in a range between about 4,000 and about 10,000. The vinyl content of the silicone polymer is typically in a range between about 0.05% and about 0.5% by weight of the silicone polymer.

Yet another embodiment of the present invention provides a composition which includes a silicone polymer, a hydrophobicity imparting particulate, coupling agent and a reinforcing filler. The hydrophobicity imparting particulate is bentonite and the reinforcing filler is fumed silica, precipitated silica, or carbon black having a surface area in a range between about 50 $m^2/g$ and about 400 $m^2/g$. Examples of coupling agents include vinyltriethoxysilane (VTES), vinyltrimethoxysilane and methacrylpropyl-trimethoxy silane.

A further embodiment of the present invention includes a silicone polymer, a hydrophobicity imparting particulate and an anti-tracking and flame retardant component. The silicone polymer is present in an amount in a range between about 25% and about 40% by weight of the total composition. The hydrophobicity imparting particulate is present in an amount in a range between about 1% and about-50% by weight of the total composition. An anti-tracking and flame retardant component is present in an amount in a range between about 25% and about 60% by weight of the total composition. An "anti-tracking and flame retardant component" as used herein refers to a component which has the ability to improve arc resistance and flame retardancy.

A further embodiment of the present invention can include a silicone polymer, a hydrophobicity imparting particulate, an anti-tracking and flame retardant, a coupling agent, a curing agent, an extending filler, and a processing fluid. "Anti-tracking" as used herein refers to a material which improves the arc resistance of the silicone composition. "Coupling agent" as used herein refers to a material which acts as a surface modifier for fumed silica and alumina trihydrate and as a crosslinker for the coupling between fumed silica and alumina trihydrate with siloxane polymer. "Curing agent" as used herein refers to a chemical which has the ability to harden the silicone composition. "Extending filler" as used herein refers to materials which improve the strength of the silicone polymer. "Processing fluid" as used herein refers to a fluid which is typically added during the compounding process to facilitate the mixing of the polymers with the fillers.

Alumina trihydrate (ATH), also commonly known as aluminum hydroxide, improves arc resistance and flame retardancy of the silicones. Alumina trihydrate is a compound represented by the chemical formula $Al_2O_3 \cdot 3H_2O$ or $Al(OH)_3$. Alumina trihydrate with a particle size of less than about 10 microns is preferred. If the blended amount of alumina trihydrate is too small, arc resistance is lost: if the blended amount is too large, processability is adversely affected. The amount of alumina trihydrate is preferably in the range between about 15 parts by weight and about 300 parts by weight of 100 parts of diorganopolysiloxane polymer or polymer mixture, and more preferably in the range between about 50 parts and about 200 parts by weight of 100 parts of polymer.

Fumed silica fine powder can be added as an extending filler to compositions of the present invention. Fumed silica having an average particle size of less than or equal to about 50 microns and a specific surface area of greater than about 100 $m^2/g$ is preferred. A smaller average particle size is preferred since it gives a higher surface area resulting in better reinforcing properties. Furthermore, surface-treated silica, for example, hydrophobic silica surface treated with organosiloxane(s), hexaorganodisilazane or diorganocyclopolysiloxane further enhance filler reinforcing properties. If the amount of fumed silica used in these formulations is too small, the mechanical strength of the silicone polymer will be deteriorated, while if it is too large, it hinders the effective use of a higher proportion of alumina trihydrate. The amount of fumed silica used is generally in the range between about 10 parts by weight and about 100 parts by weight, preferably in the range between about 20 parts by weight and about 80 parts by weight, based on 100 parts of silicone polymer. Other examples of extending filler include ground quartz, calcium carbonate, magnesium silicate or magnesium aluminum silicate.

Another type of filler, a non-reinforcing filler, can be used in the compositions of the present invention. This filler facilitates good mixing of fumed silica and alumina trihydrate with polyorganosiloxane polymers and provides compositions with well dispersed filler contents. An example of a non-reinforcing filler is electrically non-conducting ground quartz. Quartz also has good thermal conductivity properties and provides good heat transfer during the molding.

An organosilane coupling agent can be used in the silicone composition. The coupling agent renders the alumina trihydrate and fumed silica hydrophobic and interacts with the diorganosiloxane polymer to enhance alumina trihydrate and fumed silica dispersibility and reinforcing effect. The silicone composition incorporating an organosilane coupling agent typically has a dielectric strength of greater than about 300 volts per mil (vpm), tracking resistance of greater than about 100 minutes as measured by American Standard Testing Method (ASTM) test procedure number D2303, and tracking resistance of greater than about 3 kilovolt (KV) as measured by the International Electrochemical Commission (IEC) 587 procedure.

Preferred coupling agents are represented by structures represented by Formulae (II) through (V):

(II) $R^4R^5Si(OR^5)_2$;

(III) 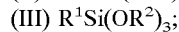$R^1Si(OR^2)_3$;

(IV) $R^4R^5Si(OOCR^5)_2$; or (V) 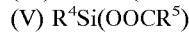$R^4Si(OOCR^5)$ wherein $R^4$ and $R^5$ independently at each occurrence represent $C_{1-6}$ alkyl groups, phenyl groups, and $C_{2-6}$ alkenyl groups.

Preferably the curing agent is peroxide-based. An organic peroxide or a combination of peroxides can be used to cure the compositions of the invention to provide rubbery elastomeric high voltage insulator parts. Examples include diacyl peroxides, ketone peroxides, peroxy esters, dialkyl peroxides, peroxyketals, peroxycarbonates and tertiary alkyl hydroperoxides.

Other optional additives used in the compositions of the present invention include coloring agents, mold release agents, and heat resistive agents. Examples of coloring agent and pigments include carbon black, red or black iron oxide, and $TiO_2$, which provide specific colors to the insulators. Examples of mold release agents include silicone fluids or metal stearates such as magnesium stearate, calcium stearate or aluminum stearate. Examples of heat resistive agents include cerium octoate, cerium hydroxide, magnesium oxide, cerium oxide and magnesium hydroxide.

The processing fluid can be a methyl or hydroxy terminated polydimethyl siloxane. Examples of processing fluid include alkylpolysiloxane oil or phenylpolysiloxane oil that is capped with hydroxyl, allyl or phenyl groups at both terminal ends of the molecular chain.

The silicone polymer is present in a range between about 15% by weight and about 50% by weight of the total composition. The hydrophobicity imparting particulate selected to impart hydrophobicity recovery property is present in a range between about 1% by weight and about 50% by weight of the total composition. The anti-tracking agent and a flame retardant component is present in a range between about 20% by weight and about 70% by weight of the total composition. The coupling agent is present in a range between about 0.01% by weight and about 1% by weight of the total composition. The curing agent is present in a range between about 0.1% by weight and about 5% by weight of the total composition. The extending filler is present up to about 20% by weight of the total composition. The processing fluid is present in a range between about 0.1% by weight and about 5% by weight of the total composition.

The high voltage insulator compositions are typically prepared by mixing silicone and the inorganic filler selected to improve hydrophobicity in the presence of silicone processing fluids and silane coupling agents. The silicone compositions optionally contain a mold release agent and a heat resistive agent. The silicone compositions can be cured at elevated temperatures and can be converted to insulators of different shapes either by compression, injection or transfer molding processes.

The silicone gum, liquid additives and pigments are charged into a kneader such as a Banbury mixer and are mixed for several minutes. Inorganic fillers are typically added in small portions during mixing to obtain a homogeneous product. The product is then discharged and milled on a two roll mill and extrusion filtered through a 150 mesh screen.

Hydrophobicity of a silicone polymer surface and time to recover hydrophobicity after the surface was treated with corona are measured. In order to measure the hydrophobicity and the hydrophobicity recover, cured silicone sheets (6 inch×6 inch×0.075 inch in size) are prepared. Change of water contact angle with a sheet, is measured before and after subjecting the sheet to corona treatment. An initial contact angle of a 1 micro-liter water droplet is measured with a goniometer. A 40 strokes corona discharge is applied at a 15 mil gap to destroy hydrophobicity. Hydrophobicity recovery is measured by monitoring the contact angle of the 1 micro liter water droplets until there is no change in contact angle. A period of several days typically passes until there is no change. The angle determined after this period is reported as recovered contact angle (RCA).

Contact angle and recovered contact angle are measured using a Video Contact Angle System 2000 instrument manufactured by Advanced Surface Technology, Inc. A one microliter drop of distilled water is automatically dispensed onto the surface of the specimen and a magnified digital image of the drop is taken. The contact angle is then measured off an enlarged image on the screen using Advanced Surface Technology software.

Most typically, the silicone composition used in the present invention is used as insulators. The insulator comprises a housing portion and includes a cured product of a silicone polymer and a hydrophobicity imparting particulate that imparts a hydrophobicity property to the cured product. The hydrophobicity imparting particulate typically excludes calcium carbonate, silica, group quartz, magnesium silicate and magnesium aluminum silicate. In a further embodiment, the housing portion of the insulator includes a cured product of a silicone polymer and two or more hydrophobicity imparting particulates. The hydrophobicity imparting particulates imparts a hydrophobicity property to the composition or to the composition and a filler.

The method of improving the hydrophobicity recovery property can be applied to both uncured and cured silicone polymer compositions. Improving the hydrophobicity recovery property includes determining a target hydrophobicity recovery property for a silicone polymer composition. An inorganic hydrophobicity imparting particulate is selected to impart a hydrophobicity recovery property to a silicone polymer composition. The inorganic hydrophobicity imparting particulate is then added into the silicone polymer composition in an amount to impart the hydrophobicity recovery property.

The method of improving a hydrophobicity property of a cured silicone polymer composition includes determining a target hydrophobicity property for a cured silicone polymer composition. An inorganic hydrophobicity imparting particulate is selected that imparts a hydrophobicity property to a silicone polymer composition. A blend of (A) a silicone polymer and (B) the selected inorganic filler is then compounded and cured by heating.

In order that those skilled in the art will be better able to practice the invention, the following examples are given by way of illustration and not by way of limitation.

EXAMPLES

In these Examples, silicone heat-cured rubber products were formulated that were suitable for molding type applications in high voltage (HV) insulator production. A diorganopolysiloxane gum (40 parts) having a viscosity in a range between about 20 million centipoise and about 30 million centipoise and consisting of 99.77 mole % dimethylsiloxane units and 0.23% methylvinylsiloxane units, a diorganopolysiloxane gum (60 parts) having viscosity in a range between about 30 million centipoise and about 120 million centipoise and consisting of 99.02 mole % dimethylsiloxane units and 0.08 mole % methylvinylsiloxane units, dimethylsiloxane oligomer end-blocked with silanol groups (60 parts) having viscosity of 30 centipoise, vinyltriethoxy silane (VTES) (0.5 parts), fumed silica treated with dimethyl tetracyclopolysiloxane (35 parts) having specific surface area of 200 m$^2$/g, alumina trihydrate (ATH) (120 parts) having an average particle diameter of 1 micron and RCA filler (35 parts) were fed into a kneader mixer (Banbury mixer) and kneaded to a homogeneous mixture at ambient temperature.

The mixture was added with aluminum stearate (0.3 parts), black silicone gum based color master batch (50% carbon black) (0.88 parts) and 2,5-dimethyl(t-butylperoxy) hexane peroxide (1.25 parts) and was mixed with a kneader to obtain a homogeneous product. The product was compression molded at 177° C. for 15 minutes.

The formulation procedure was repeated with a number of materials to determine their effect on hydrophobicity recovery. The materials used were Minusil (ground quartz), talc (hydrous magnesium silicate), silane treated talc (Mistron 604 AV, Mistron CB from Luzenac America Inc.), bentonite clay, feldspar, and calcium carbonate. Ten (10) micron Minusil was used as control. Additionally, formulations with hydrophobicity improving methoxy-stopped silicone fluids were prepared and compared to the filler containing formulations. The methoxy-stopped formulations were prepared with 1% fluid loadings and 0.5% fluid loadings.

FIG. 1 shows a statistical depiction of contact angles for a set of silicone compositions that included hydrophobicity improving components. The following Table identifies the hydrophobicity component of the compositions depicted in FIG. 1.

TABLE

| Formulation | Key Letter | RCA |
| --- | --- | --- |
| Bentonite | A | 112 |
| Talc | B | 106 |
| Silane-treated talc | C | 108 |
| 1% methoxy-stopped siloxane fluid | D | 95 |
| 0.5% methoxy-stopped siloxane fluid | E | 89 |
| Minusil | F | 85 |
| Feldspar | G | 92 |
| Calcium carbonate | H | 101 |

All contact angle measurements were for recovery of hydrophobicity. The hydrophobicity of the surface was first destroyed by corona-treating the surface (40 strokes of a corona wand, held 15 mil over the surface using a Tantec Corona Generator HV 05-2 set at 85% of full power). The corona treatment mimics electrical discharge activity on an out-door insulator surface that destroys hydrophobicity. The samples were then allowed to "recover" hydrophobicity in 24 hours. The FIG. 1 depicts recovered contact angle.

The Example shows that the hydrophobicity imparting particulates of the present invention can impart greater than 95 recovered contact angle. Addition of hydrophobicity imparting particulate improved recovered contact angle significantly and the improvements were better than obtained when known improvers such as the methoxy stopped siloxane fluids were used. See FIGS. 1, D and E.

While embodiments of the invention have been described, the present invention is capable of variations and modifications and therefore should not be limited to the precise details of the Examples. The present invention includes changes and alterations that fall within the purview of the following claims.

What is claimed is:

1. An insulator comprising a housing portion, said housing portion comprising a cured product composition of (A) a silicone polymer and (B) an hydrophobicity imparting particulate wherein said hydrophobicity imparting particulate imparts a hydrophobicity property to said composition;

and wherein the cured product composition excludes calcium carbonate, silica, ground quartz, magnesium silicate and magnesium aluminum silicate.

2. An insulator comprising a housing portion, said housing portion comprising a cured product composition of (A) a silicone polymer and (B) two or more hydrophobicity imparting particulates comprising a mixture of calcium carbonate and magnesium carbonate or a mixture of magnesium silicate and calcium carbonate wherein said hydrophobicity imparting particulates impart a hydrophobicity property to said composition or an hydrophobicity imparting particulate that imparts a hydrophobicity property to said composition and a filler.

3. A method of improving a hydrophobicity recovery property of a silicone polymer composition, comprising:

determining a target hydrophobicity recovery property for a silicone composition;

selecting a hydrophobicity imparting particulate filler to impart said hydrophobicity recovery property to said silicone composition and adding said hydrophobicity imparting particulate filler to said silicone composition in an amount to impart said target hydrophobicity recovery property.

4. A method of improving a hydrophobicity property of a cured silicone polymer composition, comprising:

determining a target hydrophobicity property for a cured silicone composition;

selecting a hydrophobicity imparting particulate filler to impart said hydrophobicity property to said silicone polymer composition;

compounding a blend of (A) a silicone polymer and (B) said selected inorganic filler, and heating to cure said blend.

* * * * *